US007523152B2

(12) United States Patent
Roussel et al.

(10) Patent No.: US 7,523,152 B2
(45) Date of Patent: Apr. 21, 2009

(54) METHODS FOR SUPPORTING EXTENDED PRECISION INTEGER DIVIDE MACROINSTRUCTIONS IN A PROCESSOR

(75) Inventors: Patrice L. Roussel, Portland, OR (US); Rajesh S. Parthasarathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 10/330,896

(22) Filed: Dec. 26, 2002

(65) Prior Publication Data

US 2004/0128337 A1 Jul. 1, 2004

(51) Int. Cl.
*G06F 7/52* (2006.01)
*G06F 7/44* (2006.01)

(52) U.S. Cl. ...................................... 708/650; 708/504
(58) Field of Classification Search ................. 708/650, 708/504
See application file for complete search history.

(56) References Cited

U.S. PATENT DOCUMENTS

| 4,785,412 | A | * | 11/1988 | Tran ........................... 708/650 |
| 5,001,664 | A | * | 3/1991 | Makita et al. ............... 708/650 |
| 5,426,600 | A | * | 6/1995 | Nakagawa et al. .......... 708/653 |
| 5,768,170 | A | | 6/1998 | Smith |
| 6,549,926 | B1 | * | 4/2003 | Kalambur et al. ........... 708/650 |
| 2004/0117423 | A1 | * | 6/2004 | Shi et al. ..................... 708/650 |

OTHER PUBLICATIONS

Huacheng, D. "Application Design for AVR Single Chip Processor", Chapter 4, Beihang University Press, May 1, 2002; 6 pages.
Office Action Received for Chinese Patent Application No. 200510106463.7 mailed Jan. 25, 2008; 7 pages.

* cited by examiner

*Primary Examiner*—Tan V Mai
(74) *Attorney, Agent, or Firm*—Lawrence M. Mennemeier (57) ABSTRACT

A method for an extended precision integer divide algorithm includes separating an L-bit integer dividend into two equal width integer format portions, a first portion including lower M bits of the integer dividend and a second portion including upper M bits of the integer dividend, where M is equal to ½ L. An N-bit wide integer divisor is converted from an integer format into a floating point format divisor. The first integer portion is converted into a floating point format and divided by the floating point format divisor to obtain a first floating point quotient, which is converted into a first integer format quotient. The second integer portion is converted into a floating point format and divided by the floating point format divisor to obtain a second floating point quotient which is also converted to a second integer format quotient. Then first and second integer format quotients are summed together to generate a third integer format quotient.

27 Claims, 9 Drawing Sheets

METHODS FOR SUPPORTING EXTENDED PRECISION INTEGER DIVIDE MACROINSTRUCTIONS IN A PROCESSOR

FIELD OF THE INVENTION

The present invention relates generally to the field of microprocessors and computer systems. More particularly, the present invention relates to a method and apparatus for an extended precision integer divide algorithm.

BACKGROUND OF THE INVENTION

Computer systems have become increasingly pervasive in our society. The processing capabilities of computers have increased the efficiency and productivity of workers in a wide spectrum of professions. As the costs of purchasing and owning a computer continues to drop, more and more consumers have been able to take advantage of newer and faster machines. Furthermore, many people enjoy the use of notebook computers because of the freedom. Mobile computers allow users to easily transport their data and work with them as they leave the office or travel. This scenario is quite familiar with marketing staff, corporate executives, and even students.

As processor technology advances, newer software code is also being generated to run on machines with these processors. Users generally expect and demand higher performance from their computers regardless of the type of software being used. One such issue can arise from the kinds of instructions and operations that are actually being performed within the processor. Certain types of operations require more time to complete based on the complexity of the operations and/or type of circuitry needed. This provides an opportunity to optimize the way certain complex operations are executed inside the processor.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

A method and apparatus for an extended precision integer divide algorithm is disclosed. The embodiments described herein are described in the context of a microprocessor, but are not so limited. Although the following embodiments are described with reference to a processor, other embodiments are applicable to other types of integrated circuits and logic devices. The same techniques and teachings of the present invention can easily be applied to other types of circuits or semiconductor devices that can benefit from higher pipeline throughput and improved performance. The teachings of the present invention are applicable to any processor or machine that performs data manipulation. However, the present invention is not limited to processors or machines that perform 128 bit, 64 bit, 32 bit, or 16 bit data operations and can be applied to any processor and machine in which extended precision integer division is needed.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

In today's processors, a number of different execution units are used to process and execute a variety of code and instructions. Not all instructions are created equal as some are quicker to complete while others can take an enormous number of clock cycles. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

The implementation of divide instructions in microprocessors and similar types of logic circuit usually involve a number of issues. Furthermore, the complexity of divide operations often leads to a need for additional circuitry in order to correctly perform divides. A number of processors presently dedicate significant amounts of hardware to floating point divide instructions as floating point divide operations are usually performance critical. For instance, the inclusion of dedicated hardware for integer divides on a size N bit processor, like a 32 bit processor, is hard to justify. Thus the addition of dedicated hardware for integers of double the size 2N, i.e. 64 bits, to accommodate larger data types with arithmetic designed for smaller types is even harder to justify.

The divide logic of 64 bit hardware can generally handle divide operations for dividends and divisors having values of 64 bits or less. For instance, divide operations that can be performed include: 64 bits by 64 bits, 64 bits by 32 bits, 32 bits by 16 bits, 16 bits by 8 bits, etc. However, operations involving values that are represented by greater than 64 bits are not easily available or even possible in some instances. Thus a processor having a 64 bit divider circuit may not be capable of handling a 128 bit by 64 bit divide without an embodiment of the present invention.

For example, if an extended precision divide instruction is needed on a processor, a designer faces a limited number of options. The designer can either add dedicated hardware to handle the extended precision divide instruction, which increases the cost and complexity of the overall design, or emulate the instruction on available floating point hardware. Hence, new solutions that can help facilitate the implementation of integer divide operations into available hardware can be desirable to ease the design burden. Embodiments of an algorithm in accordance with the present invention can allow signed and unsigned 128 bit by 64 bit integer divide instructions to be added to a processor architecture at zero cost or minimal hardware.

Embodiments of the present invention provide a way to implement an extended precision integer divide instruction as an algorithm that makes use of floating point divide instructions and floating point hardware. For one embodiment, the algorithm is based on the idea that a integer divide of a 128 bit value by a 64 bit value can be evaluated with a divide of a 128 bit value by a 64 bit value, wherein the dividend has its 64 least significant bits cleared, together with a divide of a 64 bit value by a 64 bit value. The 128 bit dividend with the 64 least significant bits cleared is a scaled version of $X_H$. A floating point adder of one embodiment can divide a 128 bit value by a 64 bit value as long as the dividend has only its leading 64 bits as non-zero. Thus, the 64 bit by 64 bit divider is really performing a 128 bit by 64 bit divide with the upper dividend. By taking advantage of an available floating point instruction capable of performing double extended precision divides, the two 64 bit by 64 bit divides can be implemented to use a floating point divider unit. Double extended precision in one instance means floating point numbers with 64 bit significands. Because the 128 bit and 64 bit values of the integer divide instruction are in an integer format, the numbers have to be scaled and converted to a floating point format prior to being used with the floating point hardware. Similarly, the outputs from the floating point divide have to be scaled and converted back to an integer format. The results of the two separate divides are merged and adjusted prior to completion of the integer divide instruction. Thus embodiments of an integer divide algorithm in accordance with the present invention can be implemented in a processor to support extended precision 128 bit by 64 bit integer divides efficiently without the use of extra hardware such as an integer divider and without seriously compromising overall performance.

In one embodiment, the extended precision integer divide algorithm is based on the usage of a floating point divide instruction. The integer divide leverages off the floating point divide in order to accomplish an integer calculation via floating point hardware. In other words, a processor including an embodiment of the present invention can perform extended precision integer divide operations without the use of an integer divider hardware. For one implementation, the precision of the floating point divide instruction has the precision of at least half that of the integer dividend. Furthermore, the precision of the divisor is no greater than the precision of the floating point divide instruction for that implementation. Under these conditions, embodiments of an efficient extended precision integer divide algorithm can be implemented to utilize a floating point divider unit.

Embodiments of the present invention enable for the implementation of a 128 bit by 64 bit division operation with a 64 bit by 64 bit divider hardware logic. The 64 bit by 64 bit divider hardware of one embodiment is actually a floating point divider capable of dividing double extended precision floating point numbers. For one embodiment of the present invention, a 128 bit value X (dividend) is divided by a 64 bit value Y (divisor) to obtain a 64 bit quotient Q and a 64 bit remainder R. In order to accomplish this division operation, embodiments of the present invention break up the 128 bit divide operation into two separate 64 bit divide operations, wherein a first 64 bit divide is performed on the lower 64 bits of the dividend and a second 64 bit divide is performed on the scaled upper 64 bits of the dividend (i.e., the 128 bit value with the lower 64 bits cleared). Thus a 64 bit by 64 bit integer divider is capable of performing a 128 bit by 64 bit divide operation. These operations can be represented as:

$X=Q*Y+R$ $X_L=Q_L*Y+R_L$ $X_H*2^{64}=Q_H*Y+R_H$ wherein $X=X_L+X_H*2^{64}$, $Q=Q_L+Q_H$, and $R=R_L+R_H$.

The number of bits described in this example and the text below are in reference to the maximum allowable bits in the particular implementation. For example, the 64 bit values here refer to the number of bits that can be used to present each the quotient and remainder. Thus a number in the quotient representable with less than the full 64 bits can have a series of leading zeros. The terms '$Q_H$' and '$R_H$' are generally referred to in the following discussion respectively as the quotient and remainder associated with the divide of the upper part of the dividend '$X_H$'. $Q_H$ and $R_H$ can also be referred to as the "high quotient" and "high remainder", respectively.

Figure 1:
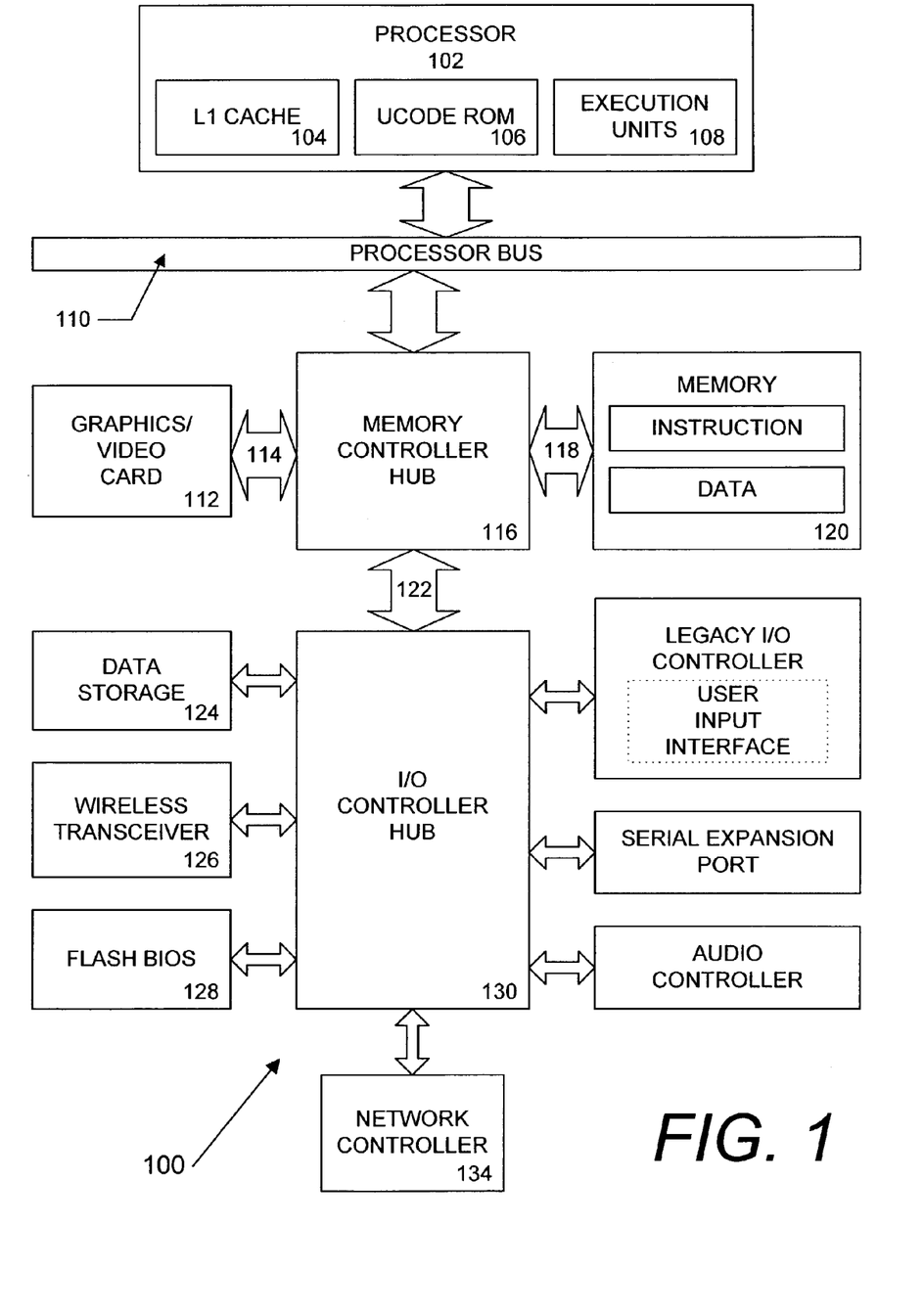
FIG. 1 is a block diagram of a computer system formed with a processor that includes execution units to execute an instruction for an extended precision integer divide operation in accordance with one embodiment of the present invention.

Referring now to FIG. 1, an exemplary computer system 100 is shown. System 100 includes a component, such as a processor 102 to employ execution units including logic to perform an extended precision integer divide algorithm, in accordance with the present invention, such as in the embodiment described herein. System 100 is representative of processing systems based on the PENTIUM® III, PENTIUM® 4, Itanium™, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, the present invention is not limited to any specific combination of hardware circuitry and software.

The present enhancement is not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that performs integer divide operations on operands. Furthermore, some architectures have been implemented to enable instructions to operate on several data simultaneously to improve the efficiency of multimedia applications. As the type and volume of data increases, computers and their processors have to be enhanced to manipulate data in more efficient methods.

FIG. 1 is a block diagram of a computer system 100 formed with a processor 102 that includes execution units 108 to perform an extended precision integer divide algorithm in accordance with the present invention. The present embodiment is described in the context of a single processor desktop or server system, but alternative embodiments can be included in a multiprocessor system. System 100 is an example of a hub architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. The processor 102 also includes a microcode (ucode) ROM 106 that stores microcode for certain macroinstructions. Execution units 108, including logic to perform integer and floating point operations, also resides in the processor 102. Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an execution unit to execute an algorithm for an extended precision integer divide can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
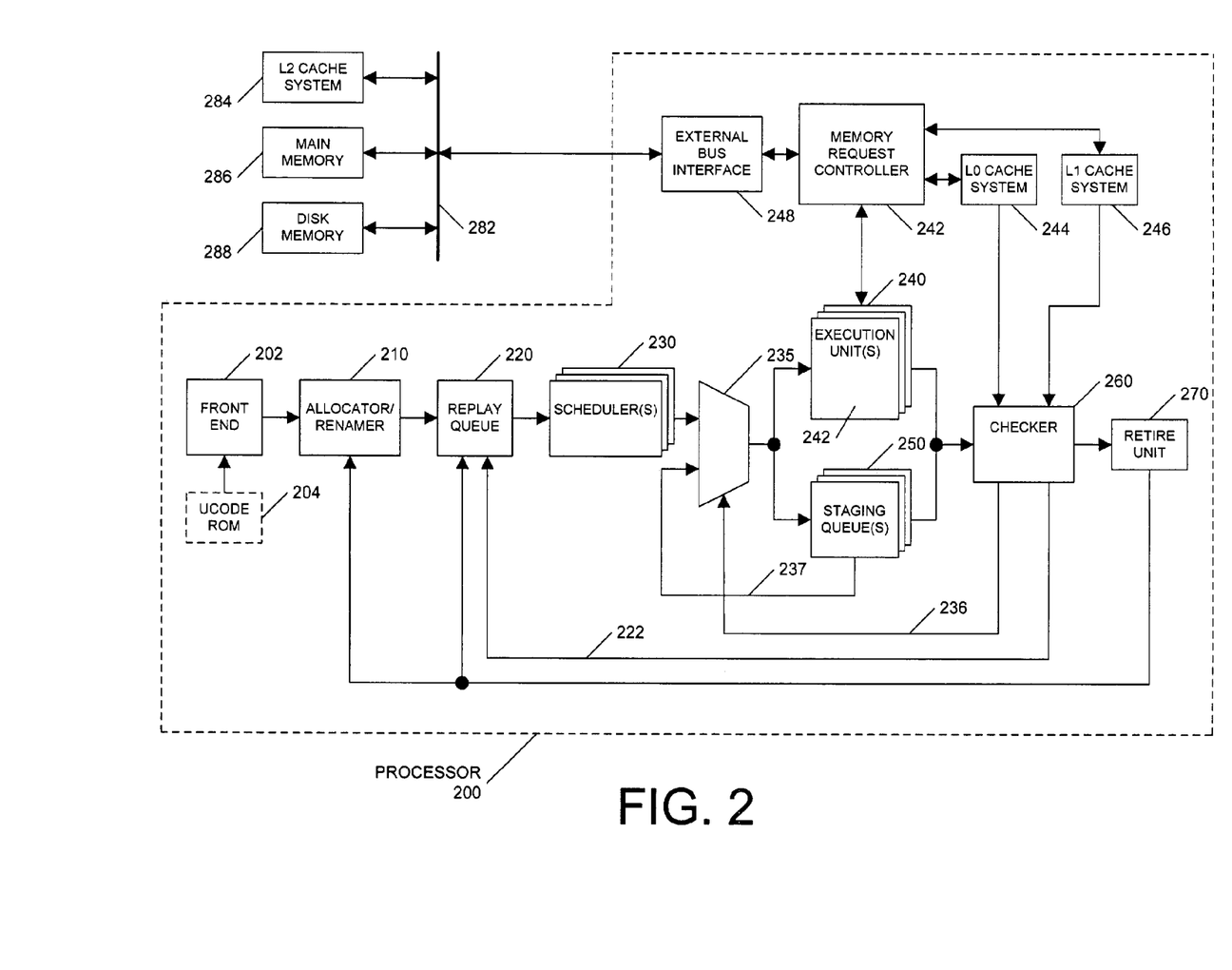
FIG. 2 is a block diagram of a processor that includes an embodiment of the present invention.

FIG. 2 is a block diagram of a processor 200 that includes an embodiment of an execution units 240 to perform extended precision integer divide operations in accordance the present invention. The front end 202 of the processing phase is coupled to schedulers 230 via allocator/renamer 210 and a rescheduler replay queue 220. A ucode ROM 204 is also coupled to the front end 202 to provide microcode routines for selected macroinstructions that are complex or would otherwise take a large number of clock cycles to decode. Instructions in the form of micro-operations (micro-ops or uops) can be dispatched speculatively from the schedulers 230. Thus the schedulers 230 can dispatch an instruction without first determining whether data needed by the instruction is valid or available. Schedulers 230 are to dispatch instructions from the front end 202 when the input data needed to execute the instructions is projected to be ready when the instruction would reach execution.

Processor 200 further includes a replay mechanism implemented via a checker 260, staging queues 250, and replay multiplexor 235. In addition replays can be done from the replay queue 220 when the checker 260 elects to do so. The replay system can replay instructions that were not executed correctly after they were scheduled by the schedulers 230. The execution units 240 can perform data speculation in executing an instruction. Execution units 240 can be an arithmetic logic unit (ALU), a floating point ALU, a memory generation unit, etc. The execution units 240 can also be collectively referred to as an execution cluster. For this embodiment, the execution units 240 include an integer ALU to handle the integer aspects of the divide and a floating point ALU to perform the floating point portion of the algorithm. One execution unit 240 of this embodiment includes a 64 bit by 64 bit integer multiplier and another execution unit 240 includes a floating point divider in accordance with the present invention. Register files coupled to the execution units 240 can store operands and other data for use during instruction execution and processing. Although the example of FIG. 2 shows three execution units 240 and three staging queues 250 in order to simplify the description, a variable number of execution units 240 and staging queues 250 can be coupled to multiple schedulers 230 depending on the particular design and implementation. Execution units 240 may be coupled to multiple levels of memory devices from which data may be retrieved and to which data may be stored. In one embodiment, execution units 240 are coupled to L0 cache 244, L1 cache 246, and external memory devices 284, 286, 288, via memory request controller 242.

If data requested is not found in L0 cache 244 or L1 cache 246, execution units 240 may attempt to retrieve the needed data from additional levels of memory. Such requests may be made through memory request controller 242. An external bus interface 248 is coupled to memory request controller 242 and external bus 282. In one embodiment, external memory devices may includes L2 cache 284, main memory 286, disk memory 288, and other storage devices which may be coupled to external bus 282. Access to external memory devices is much slower than access to the on-die cache memory. When attempting to load data to a register from memory, execution unit 240 attempts to load the data from each of the memory devices from fastest to slowest. In one embodiment, the fastest level of memory devices, L0 cache 244, is checked first, followed by L1 cache 246, L2 cache 284, main memory 286, and disk memory 288. The time to load memory increases as each additional memory level is accessed. When the needed data is eventually found, the data retrieved by execution units 240 can be stored in the fastest available memory device for future access.

The term "registers" is used herein to refer to the on-board processor storage locations that are used as part of macro-instructions to identify operands. In other words, the registers referred to herein are those that are visible from the outside of the processor (from a programmer's perspective). However, the registers described herein can be implemented by circuitry within a processor using any number of different techniques, such as dedicated physical registers, dynamically allocated physical registers using register renaming, combinations of dedicated and dynamically allocated physical registers, etc.

In this embodiment, staging queue 250 can delay instructions for a fixed number of clock cycles so that the report on problems in executing the instruction in the execution units 240 and the instruction may enter the checker 260 at the same moment in time. In various embodiments, the number of stages in staging queue 250 varies based on the amount of staging or delay desired in each execution channel. A copy of a dispatched instruction may be staged through staging queue 250 in parallel to being executed through execution units 240. In this manner, a copy of the instruction maintained in staging queues 250 is provided to checker 260. This copy of the instruction can be routed back to replay multiplexor 235 by checker 260 for re-execution if the instruction did not execute successfully.

In this architecture, a checker unit 260 is positioned after the execution core 240. The checker 260 can analyze the data dependency of the instruction and whether any error exists. Furthermore, the checker 260 also checks the condition of the result of the execution to determine whether replay is necessary. If an instruction has executed successfully, the checker 260 marks the instruction as completed and declares the instruction "replay safe". "Replay safe" instructions are forwarded to retire unit 270. For another embodiment, multiple checkers (a fast or early checker and a slow or late checker) can be used, and permit the detection of incorrect instruction execution at different points in the pipeline. Similarly, another embodiment can have multiple replay paths. Other conditions can also generate replays. The performance of the processor 200 can improve if instructions are replayed more quickly. The checker 260 is coupled to the retirement unit 270. The schedulers 230 and execution units 240 assume that everything is okay. The checker 260 and retirement unit 270 check for problems. After the execution, the micro-ops and results are temporarily stored to await commitment to architectural state. If there are no execution problems, the instructions are retired and the results committed to the architectural state.

Figure 3:
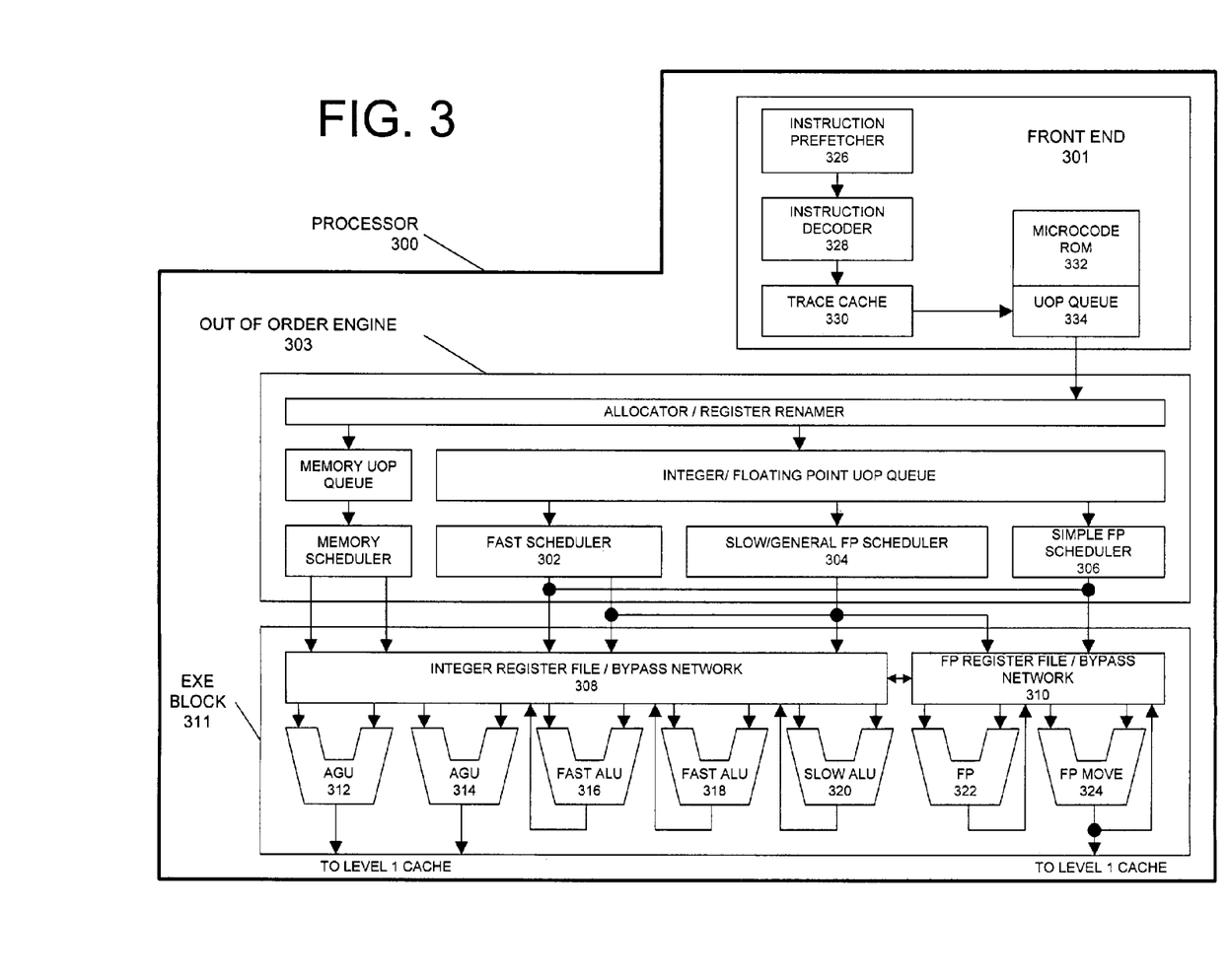
FIG. 3 is a block diagram of the micro-architecture for a processor of one embodiment that includes logic circuits to perform extended precision integer divide operations in accordance with the present invention.

FIG. 3 is a block diagram of the micro-architecture for a processor of one embodiment that includes logic circuits to perform extended precision integer divide operations in accordance with the present invention. The in-order front end 301 is the part of the processor 300 that fetches the macro-instructions to be executed and prepares them to be used later in the processor pipeline. The front end of this embodiment includes several units. The instruction prefetcher 326 fetches macro-instructions from memory and feeds them to an instruction decoder 328 which in turn decodes them into primitives called micro-instructions or micro-operations (also called micro op or uops) that the machine know how to execute. The trace cache 330 takes decoded uops and assembles them into program ordered sequences or traces in the uop queue 334 for execution. When the trace cache 330 encounters a complex macro-instruction, the microcode ROM 332 provides the uops needed to complete the operation.

Many macro-instructions are converted into a single micro-op, and others need several micro-ops to complete the full operation. In this embodiment, if more than four micro-ops are needed to complete a macro-instruction, the decoder 328 accesses the microcode ROM 332 to do the macro-instruction. Embodiments of an extended precision integer divide algorithm in accordance with the present invention can be stored within the microcode ROM 332 as a number of micro-ops are needed to accomplish the divide operation. If the instruction decoder 328 determines whether the instructions is a complex instruction. If the instruction is complex, the instruction decoder 328 refers to a entry point programmable logic array (PLA) to determine a correct micro-instruction pointer for reading the micro-code sequences for the divide algorithms in the micro-code ROM 332. For one embodiment, the first four micro-ops are taken from the trace cache 330 and the remaining micro-ops come from the micro-code ROM 332, in which case the instruction decoder 328 would send the first four micro-ops to the trace cache 330 and the micro-instruction pointer to the micro-code ROM 332. After the microcode ROM 332 finishes sequencing micro-ops for the current macro-instruction, the front end 301 of the machine resumes fetching micro-ops from the trace cache 330.

The extended precision integer divide instruction of this embodiment is considered a complex instruction. Most floating point related instructions are also complex instructions. As such, when the instruction decoder 328 encounters this integer divide macro-instruction, the microcode ROM 332 is accessed at the appropriate location to retrieve the microcode sequence for an embodiment of the integer divide algorithm of the present invention. The various micro-ops needed for this embodiment of the integer divide algorithm are communicated to the out-of-order execution engine 303 for execution at the appropriate integer and floating point execution units.

The out-of-order execution engine 303 is where the micro-instructions are prepared for execution. The out-of-order execution logic has a number of buffers to smooth out and re-order the flow of micro-instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 302, slow/general floating point scheduler 304, and simple floating point scheduler 306. The uop schedulers 302, 304, 306, determine when a uop is ready to execute based on the readiness of their dependent input register operand sources and the availability of the execution resources the uops need to complete their operation. The fast scheduler 302 of this embodiment can schedule on each half of the main clock cycle while the other schedulers can only schedule once per main processor clock cycle. The schedulers arbitrate for the dispatch ports to schedule uops for execution.

Register files 308, 310, sit between the schedulers 302, 304, 306, and the execution units 312, 314, 316, 318, 320, 322, 324 in the execution block 311. There is a separate register file 308, 310, for integer and floating point operations, respectively. Each register file 308, 310, of this embodiment also includes a bypass network that can bypass or forward just completed results that have not yet been written into the register file to new dependent uops. The integer register file 308 and the floating point register file 310 are also capable of communicating data with the other. For one embodiment, the integer register file 308 is split into two separate register files, one register file for the low order 32 bits of data and a second register file for the high order 32 bits of data. The floating point register file 310 of one embodiment has 128 bit wide entries because floating point instructions typically have operands from 64 to 128 bits in width.

The execution block 311 contains the execution units 312, 314, 316, 318, 320, 322, 324, where the instructions are actually executed. This section includes the register files 308, 310, that store the integer and floating point data operand values that the micro-instructions need to execute. The processor 300 of this embodiment is comprised of a number of execution units: address generation unit (AGU) 312, AGU 314, fast ALU 316, fast ALU 318, slow ALU 320, floating point ALU 322, floating point move unit 324. For this embodiment, the floating point execution blocks 322, 324, execute floating point, MMX, and streaming single instruction multiple data (SIMD) extension operations. The floating point ALU 322 of this embodiment includes a 64 bit by 64 bit floating point divider to execute divide, square root, and remainder micro-ops. For embodiments of the present invention, any act involving a floating point value occurs with the floating point hardware. For example, conversions between integer format and floating point format involve a floating point register file. Similarly, a floating point divide operation happens at a floating point divider. On the other hand, non-floating point numbers and integer type are handled with integer hardware resources. The simple, very frequent ALU operations go to the high-speed ALU execution units 316, 318. The fast ALUs 316, 318, of this embodiment can execute fast operations with an effective latency of half a clock cycle. For one embodiment, most complex integer operations go to the slow ALU 320 as the slow ALU 320 includes integer execution hardware for long latency type of operations, such as a multiplier, shifts, flag logic, and branch processing. Memory load/store operations are executed by the AGUs 312, 314. For this embodiment, the integer ALUs 316, 318, 320, are described in the context of performing integer operations on 64 bit data operands. In alternative embodiments, the ALUs 316, 318, 320, can be implemented to support a variety of data chucks including 16, 32, 128, 256, etc. Similarly, the floating point units 322, 324, can be implemented to support a range of operands having bits of various widths.

In this embodiment, the uops schedulers 302, 304, 306, dispatch dependent operations before the parent load has finished executing. As uops are speculatively scheduled and executed in processor 300, the processor 300 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for extended precision integer divide operations.

One embodiment of an algorithm in accordance with the present invention primarily deals with unsigned numbers. The 128 bit divide operation of this embodiment is comprised of a first 64 bit divide on the lower 64 bits $X_L$ of the dividend and a second 64 bit divide on the upper 64 bits $X_H$. The first 64 bit divide can be represented as $X_L=Q_L*Y+R_L$. Similarly, the second 64 bit divide can be represented as $X_H*2^{64}=Q_H*Y+R_H$.

Figure 4A:
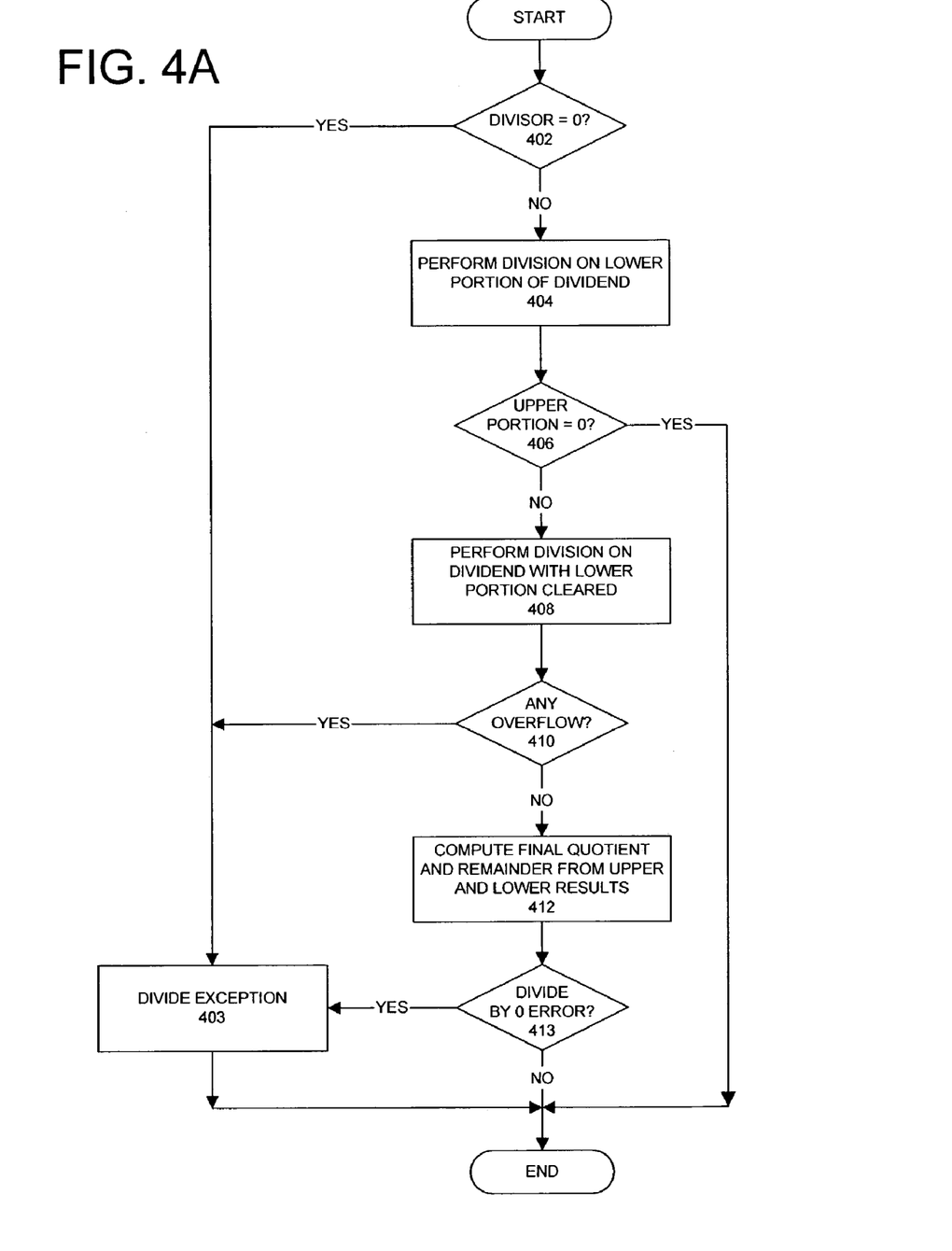
FIG. 4A is a flow chart illustrating a method of performing an unsigned integer divide operation of a 128 bit value by 64 bit value in accordance with one embodiment of the present invention.

FIG. 4A is a flow chart illustrating a method of performing an unsigned integer divide operation of a 128 bit value by 64 bit value in accordance with one embodiment of the present invention. The operands (dividend and divisor) are provided in an integer format. Similarly, the resultants (quotient and remainder) of this integer divide operation are to be retired in integer format. However, the actual divide algorithm occurs at a floating point execution unit on floating point version of the dividend and divisor to generate a quotient in a floating point format. For this embodiment, the divide operation on the 128 bit dividend is actually conducted as two separate 64 bit divisions, a first divide on the lower 64 bits of the dividend by the 64 bit divisor and then a second divide on the upper 64 bits of the dividend by the same divisor.

For this embodiment, the execution units can generally handle operands of 64 bits wide for execution. In other words, an unsigned number can range from 0 to $2^{64}-1$. However, certain instructions such as an extended precision integer divide instruction involves 128 bit wide operands such that an unsigned number ranges from 0 to $2^{128}-1$. The values outputted from the execution hardware still ranges from 0 to $2^{64}-1$. At block 402, a check is made to determine whether the divisor is equal to zero. If the divisor is equal to zero, the operation is invalid as the instruction is attempting to divide a number by zero, which is mathematically undefined. A flag is set to indicate a divide by '0' exception at block 403 if the divisor is found to be equal to zero. The divide instruction is terminated.

If the divisor is not equal to zero, the integer divide algorithm proceeds to block 404, wherein the lower 64 bit portion of the dividend is divided by the divisor in a floating point execution unit. This first divide can be represented as $X_L/Y$. Because the dividend and divisor are supplied as operands in integer format, those numbers have to be converted into a floating point format prior to use in the floating point execution unit as only the floating point format is acceptable. The resultant quotient from the floating point unit is converted from a floating point format to an integer format. The remainder for the lower portion of the dividend is calculated with an integer multiplier at an integer execution unit. The lower 64 bit portion division is described in greater detail below with FIG. 4B.

A check is performed at block 406 to determine whether the upper portion of the dividend is equal to zero. If the upper 64 bits of the dividend is equal to zero, then a upper portion divide is not necessary as the result would be a zero. Thus the final resulting quotient and remainder for the 128 bit division comprises of the quotient and remainder of the lower 64 bit division. The results are stored and the integer divide micro-op continues from the execution units to the checker and retirement unit.

If the upper portion of the dividend is not equal to zero at block 406, the integer divide algorithm of this embodiment proceeds perform a division of the 128 bit dividend, with the 64 least significant bit portion cleared, by the divisor in the floating point execution unit at block 408. The 128 bit dividend X with the least significant 64 bits cleared is the scaled version of $X_H$ (by $2^{64}$). $X_H$ is the scaled down version of the 128 bit dividend. This second divide can be represented as $(2^{64}*X_H)/Y$. Like above for the lower portion, the upper 64 bit portion of the dividend has to be converted from an integer format into a floating point format. For this embodiment, the floating point version of the divisor has been saved from the earlier conversion at block 404 and is reused here. The resultant quotient from the floating point unit for this upper portion division is also converted from a floating point format to an integer format. The remainder for the upper portion of the dividend is calculated with an integer execution unit. The upper 64 bit portion division is described in greater detail below with FIG. 4C.

Embodiments in accordance with the present invention can correctly perform a 128 bit integer divide by a 64 bit without the use of an integer divider because the "$(2^{64}*X_H)/Y$" upper portion division can be accomplished with a 64 bit extended precision floating point divide. This extended precision floating point divide returns the quotient $Q_H$ associated to the upper part of the dividend. An overflow check is performed on the floating point version of the quotient as in block 434 of FIG. 4C below. If the quotient is $>=2^{64}$, then the result would overflow and a divide error is signaled. If there is no overflow, the quotient in floating point format is converted to integer format as $Q_H$. The floating point divides have to use the truncate rounding mode. Other round modes can lead to calculation errors.

The algorithm performs overflow checks and determines if any errors occurred at block 410. If any overflow error is detected at block 410, the error is flagged as an exception at block 403. Examples of overflow checks are described in greater detail below with FIG. 4D. If no errors are found, the final quotient and remainder are computed from the upper and lower results at block 412. The results of the two separate divides on the dividend of this embodiment are summed together. This is needed in order to arrive at the correct quotient and remainder for the extended precision integer divide instruction as this embodiment of a divide algorithm in accordance with the present invention has separated the 128 bit by 64 bit divide into a pair of 64 bit by 64 bit divide operations that together yield mathematically equivalent results. The quotient of the lower 64 bit divide operation is added together with the quotient of the upper 64 bit divide operation. Similarly, the remainder of the lower 64 bit divide is added together with the remainder of the upper 64 bit divide. A divide by 0 error check is performed at block 413. If an error is detected, a divide by 0 exception is flagged at block 403.

Figure 4B:
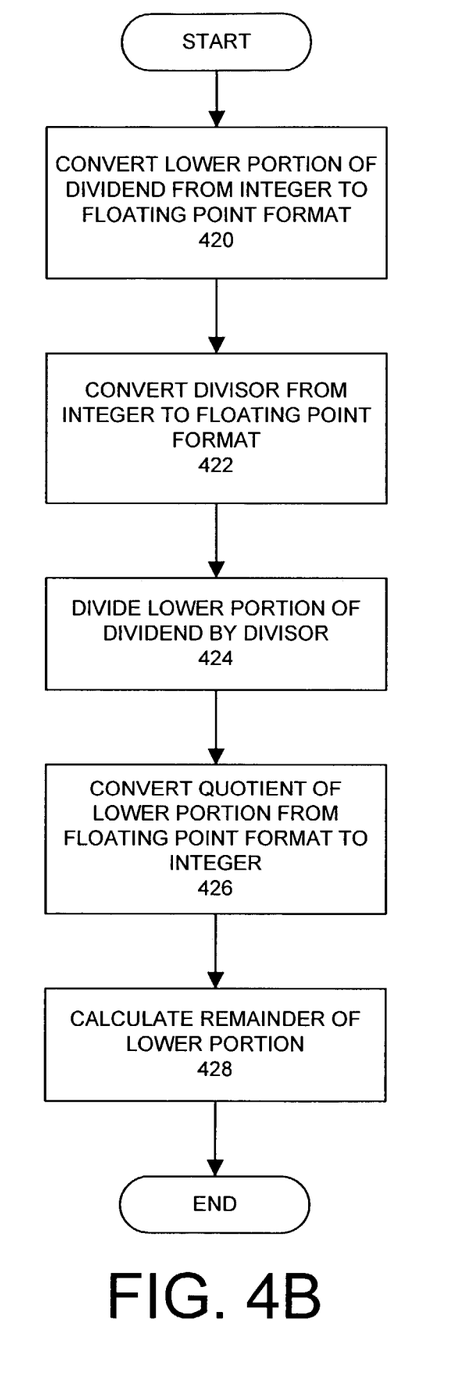
FIG. 4B is a flow chart illustrating an unsigned divide operation of a lower 64 bit portion of a 128 bit dividend for one embodiment of a method to perform a 128 bit by 64 bit integer divide operation as in FIG. 4A.

FIG. 4B is a flow chart illustrating an unsigned divide operation of a lower 64 bit portion of a 128 bit dividend for one embodiment of a method to perform a 128 bit by 64 bit integer divide operation as in FIG. 4A. The flow of this example is a more detailed description of the "$X_L/Y$" divide activity at block 404 of FIG. 4A. At block 420, this embodiment of an integer divide algorithm converts the lower portion of the 128 bit dividend from an integer format to a floating point format at a floating point register file. The 64 bit divisor is converted from its integer format to a floating point format at block 422. In this embodiment, a 64 bit by 64 bit floating point divider divides the floating point version of the lower 64 bits by the floating point version of the 64 bit divisor in a truncate rounding mode at block 424. The divider outputs a quotient in a floating point format. This lower quotient is converted to an integer format and placed in an integer register file at block 426. The remainder for this lower 64 bit portion is calculate at block 428. For this embodiment of an integer divide algorithm, the remainder is actually calculated with integer hardware. More particularly, the product of the lower quotient and the divisor is subtracted from the lower 64 bits of the dividend to yield the lower remainder. This calculation can be represented as $R_L=X_L-(Q_L*Y)$.

Figure 4C:
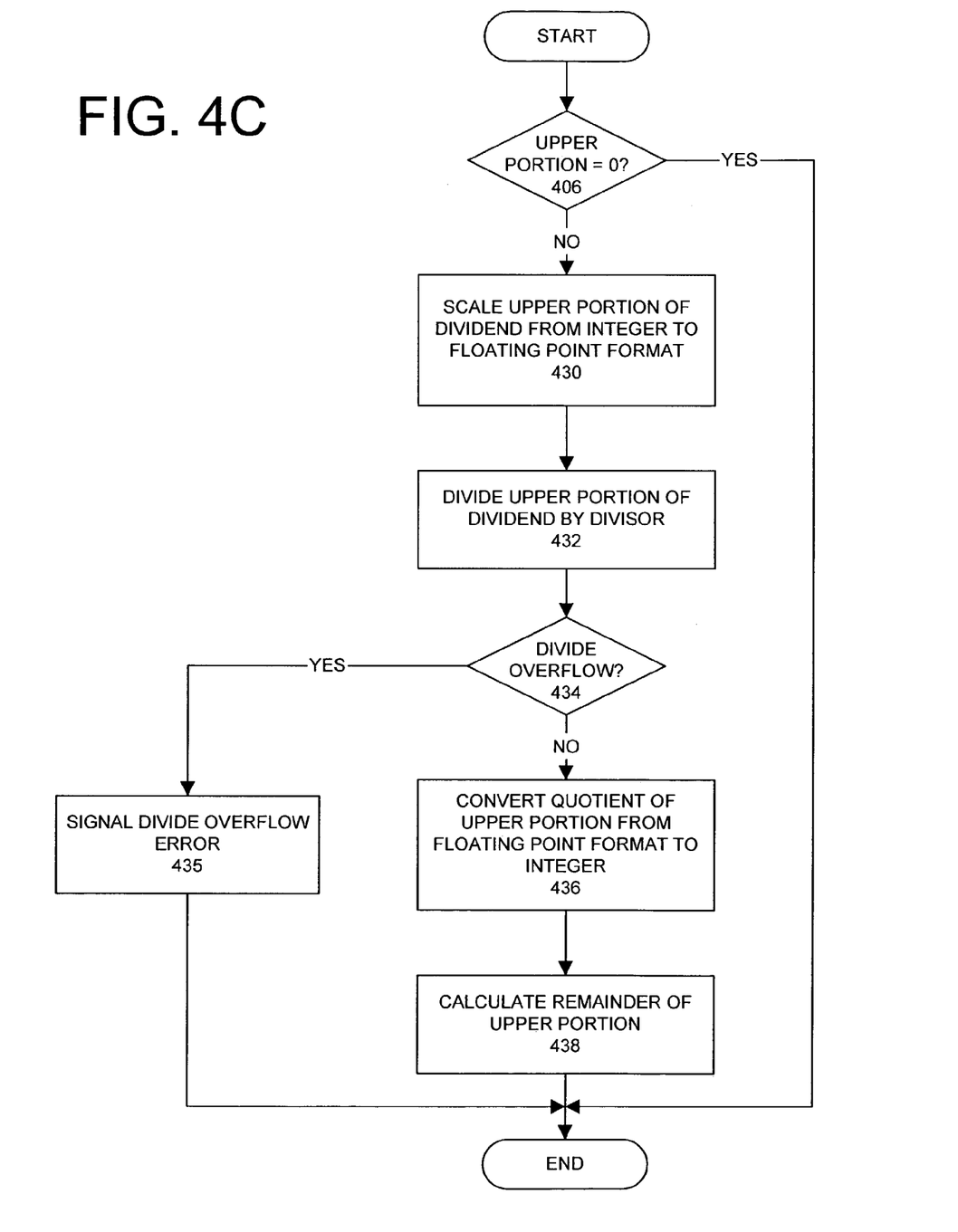
FIG. 4C is a flow chart illustrating an unsigned divide operation of an upper 64 bit portion of a 128 bit dividend for one embodiment of a method to perform a 128 bit by 64 bit integer divide operation as in FIG. 4A.

FIG. 4C is a flow chart illustrating an unsigned divide operation of an upper 64 bit portion of a 128 bit dividend for one embodiment of a method to perform a 128 bit by 64 bit integer divide operation as in FIG. 4A. The flow of this example is a more detailed description of activity at blocks 406, 408, and 412 of FIG. 4A. For this embodiment, the algorithm works because the "$(2^{64}*X_H)/Y$" divide can be done with a 64 bit extended precision floating point divide operation. A check is performed at block 406 to determine whether the upper portion of the dividend is equal to zero. If the upper 64 bits of the dividend is equal to zero, then a upper portion divide is not necessary as the result would be a zero. If the upper portion of the dividend is not equal to zero at block 406, this embodiment of an integer divide algorithm proceeds to perform a division of the upper 64 bit portion of the dividend by the divisor in the floating point execution unit. At block 430, the upper 64 bits of the 128 bit integer dividend are converted from an integer format to a floating point format at a floating point register file. Then this floating point number is scaled by a factor of $2^{64}$. This is done this way because a 128 bit integer cannot be converted to a floating point directly in this embodiment. Because this 128 bit integer is special in that its least significant 64 bits are cleared, the integer to floating point conversion can happen in two steps. First, $X_H$, the upper 64 bit integer portion of the dividend, is converted to a floating point value. Second, the floating point representation of $X_H$ is multiplied by $2^{64}$ for scaling. Thus an exact floating point representation of $X_H*2^{64}$, or dividend X with its 64 least significant bits cleared, is achieved. The floating point version of the 64 bit divisor is carried over from the earlier conversion for the lower 64 bit divide and reused here to avoid unnecessary duplication. In another embodiment, the divisor is converted from its integer format to a floating point format if the floating point version is not presently available. In this embodiment, a 64 bit by 64 bit floating point divider divides the floating point version of the scaled upper 64 bits by the floating point version of the 64 bit divisor in a truncate rounding mode at block 432. The scaled upper 64 bit dividend of the second portion of the divide operation is actually $2^{64}*$upper half of the original dividend. The divider outputs a quotient for the upper portion divide in a floating point format. A check is done at block 434 to determine if a divide overflow occurred. If a divide overflow condition exists, a divide overflow error is signaled at block 435. Specify that divide overflow check that is being done is actually quotient$>=2^{64}$ If a divide overflow is not detected at block 434, this embodiment of an integer divide algorithm proceeds to convert the high quotient to an integer format and is placed in an integer register file at block 436. The remainder for this upper 64 bit portion is calculate at block 438. For this embodiment, the remainder is calculated with integer hardware. More particularly, the product of the high quotient and the divisor is subtracted from the upper 64 bits of the dividend to yield the high remainder. This calculation can be represented as $R_H=(X_H*2^{64})-(Q_L*Y)$. Although this equation for $R_H$ implies that 128 bit integer arithmetic is needed in order to evaluate $R_H$, present embodiments can simply employ 64 bit integer arithmetic to compute $R_H$ as only the 64 least significant bits of the 128 bit expression is needed in determining $R_H$. The resultant $R_H$ is comprised of the least significant 64 bits. Thus embodiments of the 128 bit by 64 bit integer divide algorithm of the present invention can be implemented efficiently with the use of mainly a 64 bit extended precision floating point divide and 64 bit integer arithmetic.

For this embodiment of the integer divide algorithm, an optimization is used to facilitate the evaluation of "$R_H = (X_H*2_{64})-(Q_H*Y)$" in order to get the remainder $R_H$ associated to the upper part of the dividend $X_H$. The optimization of this embodiment is comprised of two pieces. The first piece is based on the fact that because $R_H$ has to be larger than or equal to zero and smaller than $2^{64}$, only the lower part (least significant 64 bits) of the product Of "$Q_H*Y$" has to be computed. The upper part is unnecessary. Similarly, the second piece is based on the fact that because the lower part (least significant 64 bits) of the product of "$X_H*2^{64}$", is zero, $R_H$ is simply the 2's complement of the lower part of product Of "$Q_H*Y$". As a result, a 128 bit subtraction that would have been needed to compute $R_H$ can simply be replaced by taking the 2's complement of a 64 bit quantity (the lower part of the "$Q_H*Y$" product). Furthermore, the multiplier does not need to return the full 128 bit product. Hence, there is no need for doing 128 bit arithmetic that would have entailed a multiplier returning 128 bits and a subtract/add dealing with 128 bit quantities.

Figure 4D:
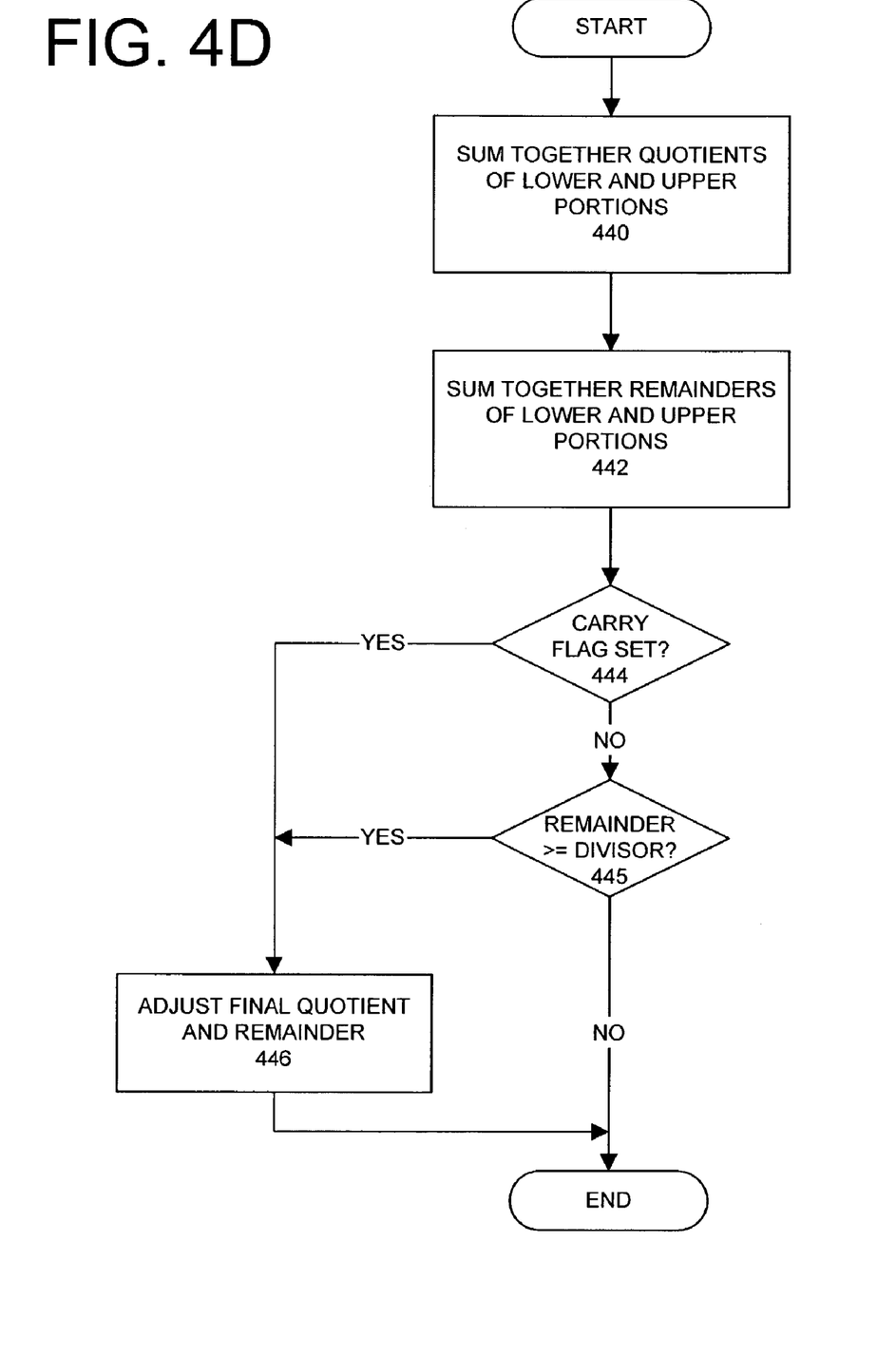
FIG. 4D is a flow chart illustrating post-divide processing of the upper and lower 64 bit portions of a 128 bit dividend for the embodiment of FIG. 4A.

FIG. 4D is a flow chart illustrating post-divide processing of the upper and lower 64 bit portions of a 128 bit dividend for the embodiment of FIG. 4A. The flow of this example is a more detailed description of activity at blocks 410 and 412 of FIG. 4A. At block 440, the integer formatted quotients from the divisions of the lower 64 bit and the upper 64 bit portions are summed together at an integer execution unit to generate the final quotient for the original 128 bit dividend. The equation for this is $Q=Q_L+Q_H$. The integer formatted remainders from the division of the lower 64 bit and the upper 64 bit portions are summed together at an integer execution unit to generate the final remainder for the 128 bit divide at block 442. A check is performed at block 444 to determine whether a carry flag has been set. A carry flag here can indicate that the remainder addition had an overflow and there was a carry over from the operation. The final quotient and remainder are adjusted at block 446. This adjustment comprises decreasing the remainder value by the amount of the divisor and increases the quotient value by '1' to reflect the extra divisor value found and removed from the remainder.

If a carry flag is not set at block 444, a check is made at block 445 as to whether the summed remainder from block 442 is greater than the value of the divisor. If the remainder is greater than or equal to the divisor, the final quotient and remainder are adjusted at block 446. If the remainder is less than the divisor, no adjustments are needed. The checks of block 444 and 445 can be stated as:

```
if [(R_H + R_L) >= Y] or [carry flag = 1, based on the 'R_H + R_L' operation]
then {
    R = R_H + R_L - Y;
    Q = Q_H + Q_L + 1;
}
else {
    R = R_H + R_L;
    Q = Q_H + Q_L;
}
```

Thus if no adjustments are made to the quotient or remainder values, the summed quotient of block 440 and summed remainder of 442 are the final resultant quotient and remainder values for the overall 128 bit by 64 bit divide operation. If adjustments have been made to the summed values, then the adjusted values from block 446 are the final quotient and remainder resultants for the 128 bit by 64 bit divide operation. The execution of this embodiment of an extended precision integer divide instruction is complete at this point and the instruction can be sent for retirement.

Another embodiment of an algorithm can also handle division operations with signed numbers. The algorithm is also adaptable to handle signed numbers such that the above described unsigned division embodiment serves as a subroutine for a signed division embodiment. In order to utilize the unsigned divide algorithm of the above embodiment, the unsigned divide algorithm is supplemented with certain pre-divide and post-divide processing procedures. The pre-divide processing comprises the converting of the signed numbers, the dividend and the divisor, from a signed format to an unsigned format. This embodiment then proceeds with the divide operation as in the unsigned divide embodiment. The post-divide processing comprises of checks to catch overflow conditions and to fix the signs of the quotient and remainder. Thus, the pre-divide and post-divide procedures enable the reuse of the unsigned divide algorithm by handling the signs. The signed divide operation is described in greater detail below.

Figure 5A:
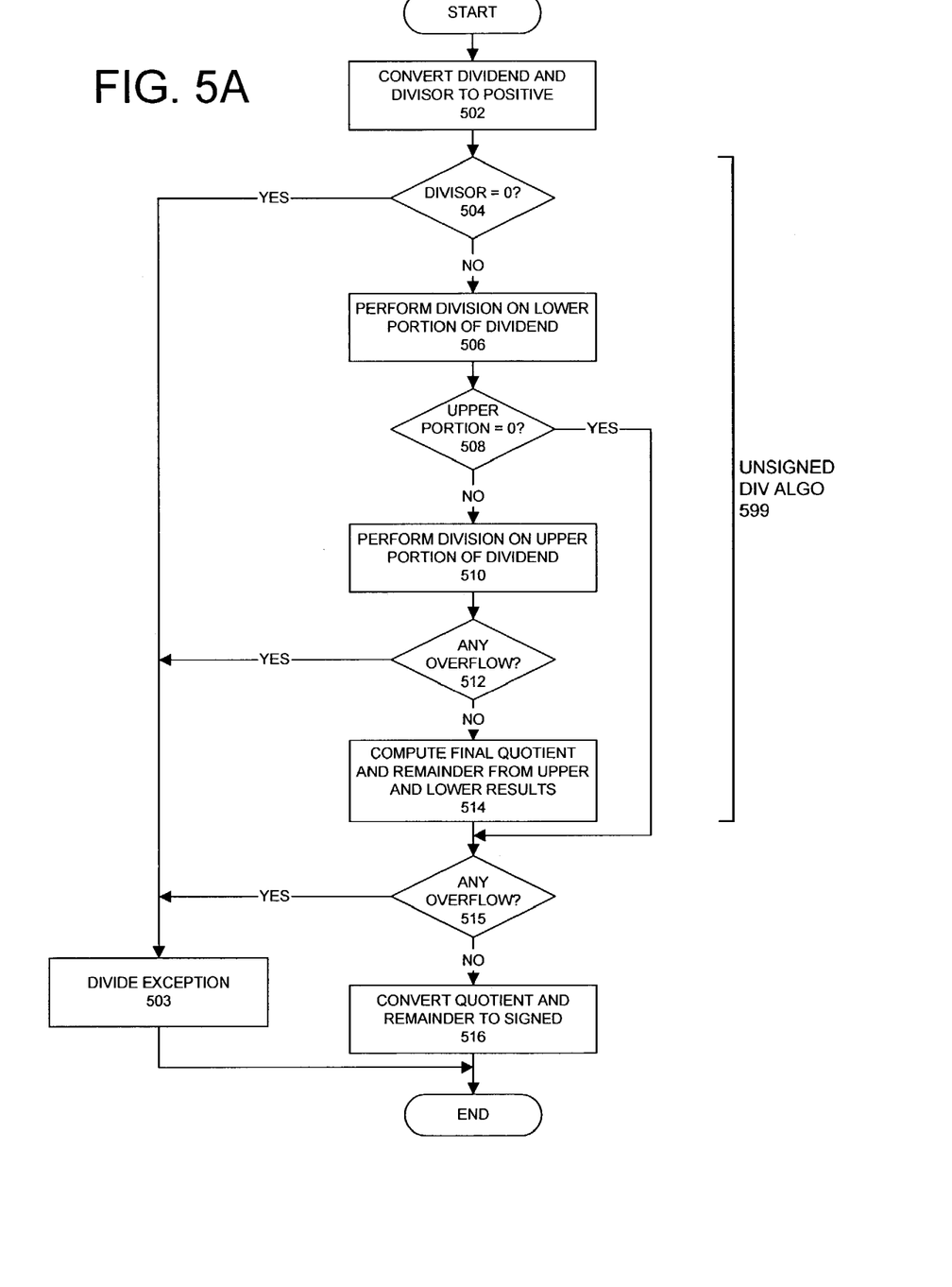
FIG. 5A is a flow chart illustrating a method of performing a signed integer divide operation of a signed 128 bit value by a signed 64 bit value in accordance with another embodiment of the present invention.

FIG. 5A is a flow chart illustrating a method of performing a signed integer divide operation of a signed 128 bit value by a signed 64 bit value in accordance with another embodiment of the present invention. For this embodiment, the core of the signed integer divide algorithm comprises of the unsigned integer divide algorithm 599 similar to that of FIG. 4A. In this embodiment of the signed divide, the handling and manipulation of signs are taken care of in the integer realm before and after the unsigned divide sequence. The dividend and divisor are provided as operands of the instruction in a signed integer format. Similarly, the quotient and remainder resultants of this instruction are also expected to be retired in a signed integer format. Where as an unsigned 64 bit number ranges from 0 to $2^{64}$, a signed 64 bit signed number actually extends from $-2^{63}$ to $+(2^{63}-1)$. The divide operation of a signed 128 bit dividend comprises of preprocessing of signs, a first divide on the lower 64 bits of the dividend by a 64 bit divisor at a floating point execution unit, a second divide on the upper 64 bits of the dividend by the 64 bit divisor, and post-divide processing of signs and checks.

The pre-divide sign processing of this embodiment occurs at block 502. At block 502, the signed dividend and divisor operands are converted from a signed integer format to an unsigned integer format. The conversion to an unsigned integer format can also be referred to as a "convert to positive" operation as the absolute value of a signed number can be treated as an unsigned value. For this embodiment, the signed integer divide algorithm calls an unsigned divide algorithm 599 to perform the division at a floating point unit. The unsigned divide algorithm 599 here comprises of activity between block 504 and 512. At block 504, a check is made to determine whether the divisor is equal to zero. If the divisor is equal to zero, a divide by '0' exception is flagged at block 503 and the integer divide instruction is terminated.

If the divisor is not equal to zero at block 504, the unsigned lower 64 bit portion of the dividend is divided by the unsigned divisor in as a floating point operation at block 506. The dividend and divisor are converted into a floating point format prior to use in the floating point divider. The resultant quotient from the floating point unit is converted from a floating point format to an unsigned integer format. The remainder for the lower portion of the dividend is calculated with an integer multiplier at an integer execution unit. This unsigned remainder is calculated by subtracting the product of the lower quotient and the divisor from the lower 64 bits of the dividend. This calculation can be represented as $R_L=X_L-(Q_L*Y)$.

A check is performed at block 508 to determine whether the upper portion of the dividend is equal to zero. If the upper 64 bits of the dividend is equal to zero, then a upper portion divide is not necessary as the result would be a zero. If the upper portion of the dividend is not equal to zero, this embodiment proceeds to divide the unsigned upper 64 bit portion of the dividend (i.e., the $2^{64}$ scaled upper portion of the 128 bit dividend) by the unsigned divisor in the floating point unit at block 510. Like the earlier lower portion divide, the 128 bit dividend with its least significant 64 bits cleared to leave an upper 64 bit portion of the dividend has to be converted from an integer format into a floating point format. The floating point version of the divisor from block 506 is reused here. In one embodiment, overflow checks are performed on the floating point version of the quotient. If the quotient is $>=2^{64}$, then the result will overflow and be detected by error checks. If there is an overflow, a divide error is signaled. If there is no overflow, then the quotient in floating point format is converted into integer format as $Q_H$. The resultant quotient from the floating point unit for this upper portion division is also converted from a floating point format to an unsigned integer format. The remainder for the upper portion of the dividend is calculated with an integer execution unit. This unsigned high remainder is calculated by subtracting the product of the high quotient and the divisor from the upper 64 bits of the dividend. This calculation can be represented as $R_H=(X_H*2^{64})-(Q_L*Y)$.

Overflow checks are performed at block 512. If any error is detected, an exception is flagged at block 503. At block 514, the final quotient and remainder are computed from the upper and lower results. The results of the two separate 64 bit by 64 bit unsigned divides on the 128 bit dividend of this embodiment are summed together at block 514. The unsigned results of the lower 64 bit divide operation is summed with the unsigned results of the upper 64 bit divide operation, respectively. With signed divides, there are additional overflow checks at block 515. Any detected errors will can an exception at block 503. The combined unsigned quotient and remainder are converted to final signed values at block 516. The post-divide processing comprising initial overflow checks of block 512, summations of block 514, additional error checks of block 515), and sign conversions of block 516 for this embodiment are described in greater detail below with FIG. 5B. If no errors are found, the final signed results are stored and the integer divide micro-op continues from the execution units to the checker and retirement unit.

Figure 5B:
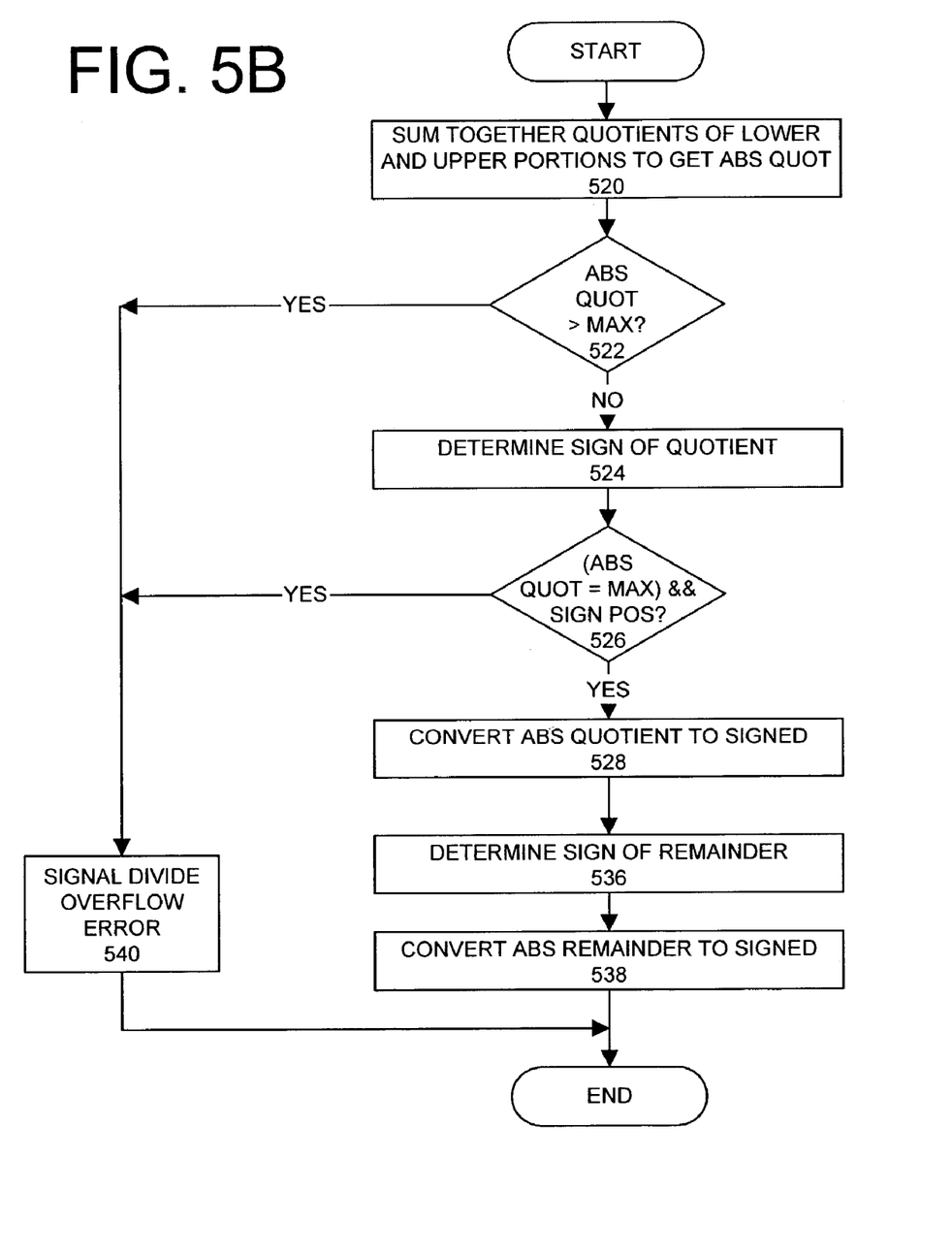
FIG. 5B is a flow chart illustrating post-divide processing of the results of the 128 bit by 64 bit integer divide operation of FIG. 5A.

FIG. 5B is a flow chart illustrating post-divide processing of the results of the 128 bit by 64 bit integer divide operation of FIG. 5A. At block 520, the unsigned quotients of the lower 64 bit divide and the upper 64 bit divide are added together to obtain an unsigned or absolute value of the quotient for the 128 bit division. Because the numeric range of a 64 bit number differs in the signed and unsigned realms, additional checks are needed in dealing with signed numbers. The check at block 522 is to determine whether the absolute value of the final quotient from block 520 is greater than the maximum value that can be handled in the signed 64 bit format. For this embodiment, the absolute value of the final quotient is compared against $2^{63}$, as 64 bit 2's complement format that can represent numbers in the range from $2^{63}$ to $2^{63}-1$. If the absolute quotient is great than the $2^{63}$ limit, the number cannot be represented in the 64 bit output from the integer hardware. A divide overflow error is signaled at block 540.

If the absolute quotient is less than or equal to $2^{63}$, the sign for the final quotient is determined at block 524. For this embodiment, the sign of the quotient is calculated as a "logical exclusive or" (XOR) of the sign of the original 128 bit signed dividend and the sign of the original 64 bit signed divisor: $SIGN_{QUOTIENT}=SIGN_{DIVIDEND}$ XOR $SIGN_{DIVISOR}$. So if the original signs of the dividend and divisor are the same, the sign of the final quotient is positive (+). But if the original signs of the dividend and divisor are different, the sign of the final quotient is negative (−). At block 526, a check is performed to determine whether the signed value of the final quotient is within the maximum value that can be handled in the signed 64 bit format. For this embodiment, representable values of the final quotient range from $-2^{63}$ to $+(2^{63}-1)$, inclusive. During the check of block 526, if the absolute value of the final quotient is equal to $2^{63}$ and the sign of the final quotient is positive, the number will not be representable as the upper limit for positive numbers is $2^{63}-1$. An overflow is detected when a quotient is equal to $2^{63}$ and the sign of the quotient is positive. Thus a divide overflow error is signaled at block 540. If the absolute value of the final quotient is equal to $2^{63}$ and the sign of the final quotient is negative, the number is representable as the lower limit for negative numbers is $-2^{63}$. The correct sign is applied to the absolute value of the final quotient at block 528 wherein the result is a signed integer number as the quotient for the 128 bit divide operation.

If the absolute value of the remainder is less than the divisor, the sign for the final remainder is determined at block 536. For this embodiment, the remainder takes on the same sign as the dividend: $SIGN_{REMAINDER}=SIGN_{DIVIDEND}$. The correct sign is applied to the absolute value of the final remainder at block 538 wherein the result is a signed integer number as the remainder for the 128 bit divide operation. The final signed quotient and remainder are stored in a integer register file and await retirement of its extended precision integer divide instruction and application of the results to the architectural state.

Although the above examples and discussion have been in the context of a 128 bit by 64 bit divide, it is recognized that other extended precision integer divides can have different lengths. For instance, another embodiment of the present algorithm can be implemented in a processor having integer and/or floating point hardware to support wider operands such as for a 256 bit by 64 bit divide, 256 bit by 128 bit divide, etc. Similarly, the precision of the integer and floating point operations and operands can vary in alternative embodiments. The embodiments described above are in the context of performing a divide operation on as two divides, wherein an upper portion and a lower portion of a dividend are handled in individual divisions. Other embodiments of the present invention can be implemented for any divide with an L bit dividend and an M bit divisor, wherein L/M is any integer number. For example, the logic can be extrapolated to separate a divide operation of a L bit dividend out into four individual divisions of four different portions of the dividend. The techniques and teachings of the present invention can be extended in other implementations to support the desired number of bits and precision for the particular integer divide.

Although the above examples describe the execution of an instruction as semi-fast operations in the context of execution units and logic circuits, other embodiments of the present invention can be accomplished by way of software. Such software can be stored within a memory in the system. Similarly, the code can be distributed via a network or by way of other computer readable media. For instance, a computer program may be distributed through a computer readable medium such as a floppy disk or a CD ROM, or even a transmission over the Internet. Thus, a machine-readable medium can include any mechanism for storing or transmitting information in a form readable by a machine (e.g., a computer). For example, a machine-readable medium can include a read only memory (ROM), random access memory (RAM), magnetic disk storage media, optical storage media, flash memory devices, and electrical, optical, acoustical or other forms of propagated signals (e.g., carrier waves, infrared signals, digital signals, etc.).

Furthermore, embodiments of integrated circuit designs in accordance with the present inventions can be communicated or transferred in electronic form. For example, the electronic form of an integrated circuit design of a processor in one embodiment can be processed or manufactured via a fab to obtain a computer component. In another instance, an integrated circuit design in electronic form can be processed by a machine to simulate a computer component. Thus the circuit layout plans and/or designs of processors in some embodiments can be distributed via machine readable mediums or embodied thereon for fabrication into a circuit or for simulation of an integrated circuit which, when processed by a machine, simulates a processor. A machine readable medium is also capable of storing data representing predetermined functions in accordance with the present invention in other embodiments.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method, machine implemented according to micro-operations responsive to decoding of a macroinstruction specifying an extended precision integer division operation of a first L bits wide integer dividend by an N bits wide integer divisor, to execute the specified extended precision integer division operation, the method comprising:

separating said first L bits wide integer dividend into two equal width portions, wherein a first integer format portion comprises lower M bits of said first integer dividend and a second integer format portion comprises upper M bits of said first integer dividend, wherein M is equal to ½ L;

converting said first integer format portion into a first floating point format portion;

converting said N bits wide integer divisor from an integer format into a floating point format divisor;

dividing said first floating point format portion by said floating point format divisor to obtain a first floating point format quotient;

converting said first floating point format quotient into a first integer format quotient;

converting said second integer format portion into a second floating point format portion;

dividing said second floating point format portion by said floating point format divisor to obtain a second floating point format quotient;

converting said second floating point format quotient to a second integer format quotient; and summing together said first and said second integer format quotients to generate a third integer format quotient.

2. The method of claim 1 wherein further comprising:

calculating a first remainder by subtracting a product of said first integer format quotient and said integer divisor from said first integer format portion;

calculating a second remainder by subtracting a product of said second integer format quotient and said integer divisor from a product of said second integer format portion and $2^M$; and summing together said first and second remainders to generate a third integer format remainder.

3. The method of claim 2 further comprising:

determining whether said divisor is equal to zero; and signaling a divide by zero exception if said divisor is equal to zero.

4. The method of claim 3 further comprising:

determining whether said second integer format portion is equal to zero; and skipping converting of said second integer portion and said dividing of said second floating point format portion if said second integer format is equal to zero.

5. The method of claim 4 further comprising:

checking for overflows and errors; and signaling any overflows or errors detected.

6. The method of claim 5 wherein said checking for overflows and errors further comprises determining whether division of said second floating point format portion results in a divide overflow error.

7. The method of claim 6 wherein said summing together of said first and second remainders further comprises determining whether a carry over is generated; and adjusting said third integer format quotient and said third integer format remainder if a carry over is detected.

8. The method of claim 7 wherein checking for overflows and errors further comprises determining whether said third integer format remainder is greater than or equal to said integer divisor; and adjusting said third integer format quotient and said third integer format remainder if said third integer format remainder is greater than or equal to said integer divisor.

9. The method of claim 8 wherein said adjusting of said third integer format quotient comprises increasing said third integer format quotient by a value of one; and wherein said adjusting of said third integer format remainder comprises decreasing said third integer format remainder by a value of said integer divisor.

10. The method of claim 9 wherein L is equal to 128 and M is equal to 64 and N is equal to 64.

11. The method of claim 9 wherein L is equal to 256 and M is equal to 128 and N is equal to 128.

12. A method, machine implemented according to micro-operations responsive to decoding of a macroinstruction specifying an extended precision integer division operation of a first L bits wide signed integer dividend by an M bits wide signed integer divisor, to execute the specified extended precision integer division operation, the method comprising:

converting said L bits wide signed integer dividend into a L bits wide unsigned integer dividend and said M bits wide signed integer divisor into a M bits wide unsigned integer divisor;

separating said L bits wide unsigned integer dividend into an N bits wide first segment and an N bits wide second segment, wherein said first segment is comprised of lowermost N bits of said unsigned integer dividend and said second segment is comprised of uppermost N bits of said unsigned integer dividend;

converting said first segment into a first floating point dividend and said second segment into a second floating point dividend and said integer divisor into a floating point divisor;

dividing said first floating point dividend by said floating point divisor to generate a first floating point quotient;

converting said first floating point quotient into a first unsigned integer quotient;

dividing said second floating point dividend by said floating point divisor to generate a second floating point quotient;

converting said second floating point quotient into a second unsigned integer quotient;

summing together said first and second unsigned integer quotients to obtain a third unsigned integer quotient; and converting said third unsigned integer quotient into a signed integer quotient.

13. The method of claim 12 further comprising:

calculating a first unsigned integer remainder by subtracting a product of said first integer quotient and said unsigned integer divisor from said first segment;

calculating a second unsigned integer remainder by subtracting a product of said second integer quotient and said unsigned integer divisor from a product of said second segment and $2^M$;

summing together said first and second unsigned integer remainders to obtain a third unsigned integer remainder; and converting said third unsigned integer remainder into a signed integer remainder.

14. The method of claim 13 further comprising:

determining whether said unsigned integer divisor is equal to zero; and signaling a divide by zero exception if said unsigned integer divisor is equal to zero.

15. The method of claim 14 further comprising:

determining whether said second segment is equal to zero; and skipping said converting of said second segment and said dividing of said second floating point dividend if said second portion is equal to zero.

16. The method of claim 15 further comprising:

checking for overflows and errors; and signaling any overflows or errors detected.

17. The method of claim 16 wherein said checking for overflows and errors further comprises determining whether division of said second floating point dividend results in a divide overflow error.

18. The method of claim 17 wherein said checking for overflows and errors further comprises determining whether said summing together of said first and second unsigned integer remainders results in an carry over; and adjusting said third unsigned integer quotient and said third unsigned integer remainder if a carry over is detected.

19. The method of claim 18 wherein said adjusting of said third unsigned integer quotient comprises increasing said third unsigned integer quotient by a value of one; and wherein said adjusting of said third unsigned integer remainder comprises decreasing said third unsigned integer remainder by a value of said unsigned integer divisor.

20. The method of claim 19 wherein L is equal to 128 and M is equal to 64 and N is equal to 64.

21. The method of claim 20 wherein said signed integer quotient and said signed integer remainder are each 64 bits wide.

22. The method of claim 21 wherein sign of said signed integer quotient is computed from an "exclusive or" (XOR) of sign of said signed integer dividend and a sign of said signed integer divisor.

23. The method of claim 22 wherein sign of said signed integer remainder is equal to said sign of said signed integer dividend.

24. A machine accessible tangible medium including micro-operations that when accessed by said machine, responsive to decoding of a macroinstruction specifying an extended precision integer division operation of a first integer dividend by an integer divisor, causes said machine to perform a method comprising:

separating a first integer dividend into two equal width portions, wherein a first integer format portion comprises lower order bits of said first integer dividend and a second integer format portion comprises upper order bits of said first integer dividend;

converting said first integer format portion into a first floating point format portion;

converting an integer divisor from an integer format into a floating point format divisor;

dividing said first floating point format portion by said floating point format divisor to obtain a first floating point format quotient;

converting said first floating point format quotient into a first integer format quotient;

converting said second integer format portion into a second floating point format portion;

dividing said second floating point format portion by said floating point format divisor to obtain a second floating point format quotient;

converting said second floating point format quotient to a second integer format quotient; and summing together said first and said second integer format quotients to generate a third integer format quotient.

25. The machine accessible tangible medium including data that when accessed by said machine causes said machine to perform the method of claim 24 further comprising:

checking for overflows and errors; and signaling any overflows or errors detected.

26. The machine accessible tangible medium including data that when accessed by said machine causes said machine to perform the method of claim 24 further comprising:

determining whether said divisor is equal to zero; and signaling a divide by zero exception if said divisor is equal to zero.

27. The machine accessible tangible medium including data that when accessed by said machine causes said machine to perform the method of claim 24 further comprising:

determining whether said second integer format portion is equal to zero; and skipping converting of said second integer portion and said dividing of said second floating point format portion if said second integer format is equal to zero.

* * * * *